(12) United States Patent
Diab et al.

(10) Patent No.: US 8,358,667 B2
(45) Date of Patent: *Jan. 22, 2013

(54) METHOD AND SYSTEM FOR TRIGGERING TRAINING FOR ETHERNET CHANNELS TO SUPPORT ENERGY EFFICIENT ETHERNET NETWORKS

(75) Inventors: Wael William Diab, San Francisco, CA (US); Howard Frazier, Pleasanton, CA (US); Scott Powell, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 12/042,152

(22) Filed: Mar. 4, 2008

(65) Prior Publication Data

US 2009/0097390 A1 Apr. 16, 2009

Related U.S. Application Data

(63) Continuation-in-part of application No. 11/859,429, filed on Sep. 21, 2007, now Pat. No. 8,218,567.

(60) Provisional application No. 60/917,870, filed on May 14, 2007, provisional application No. 60/894,240, filed on Mar. 12, 2007.

(51) Int. Cl.
*H04J 3/16* (2006.01)
(52) U.S. Cl. ...................................................... 370/468
(58) Field of Classification Search .................. 370/437, 370/468
See application file for complete search history.

(56) References Cited

U.S. PATENT DOCUMENTS

| | | | |
|---|---|---|---|
| 6,591,303 B1 * | 7/2003 | Hendel et al. | 709/238 |
| 2004/0001450 A1 * | 1/2004 | He et al. | 370/286 |
| 2006/0034295 A1 * | 2/2006 | Cherukuri et al. | 370/395.52 |
| 2007/0280239 A1 | 12/2007 | Lund | |
| 2008/0134165 A1 * | 6/2008 | Anderson et al. | 717/173 |
| 2008/0225881 A1 * | 9/2008 | Powell | 370/463 |
| 2009/0097389 A1 * | 4/2009 | Diab et al. | 370/201 |
| 2009/0097391 A1 * | 4/2009 | Diab et al. | 370/201 |
| 2009/0097392 A1 * | 4/2009 | Diab et al. | 370/201 |
| 2009/0097393 A1 * | 4/2009 | Diab et al. | 370/201 |
| 2009/0125735 A1 | 5/2009 | Zimmerman | |
| 2009/0154473 A1 * | 6/2009 | Diab et al. | 370/400 |

* cited by examiner

*Primary Examiner* — Mark Rinehart
*Assistant Examiner* — Matthew Hopkins
(74) *Attorney, Agent, or Firm* — Farjami & Farjami LLP

(57) ABSTRACT

An Ethernet link may comprise one or more link partners that may be communicatively coupled via one or more silent channels. One or more circuits and/or parameters corresponding to silent channels may be retrained, refreshed and/or updated based on various triggers, for example, fixed times, periodic or aperiodic time intervals, random or pseudorandom timer, events, link statistics, physical conditions such as noise, temperature level, cable type and/or cable length, communication from a corresponding link partner and/or based on programming from, for example, a layer above the physical layer. The retraining, refreshing and/or parameter updating may occur for one or more of an echo canceller, a far-end crosstalk canceller and a near-end crosstalk canceller corresponding to the one or more silent channels. Subsequent to the retraining, refreshing and/or parameter updating, the one or more silent channels may be activated and/or may remain silent.

24 Claims, 4 Drawing Sheets

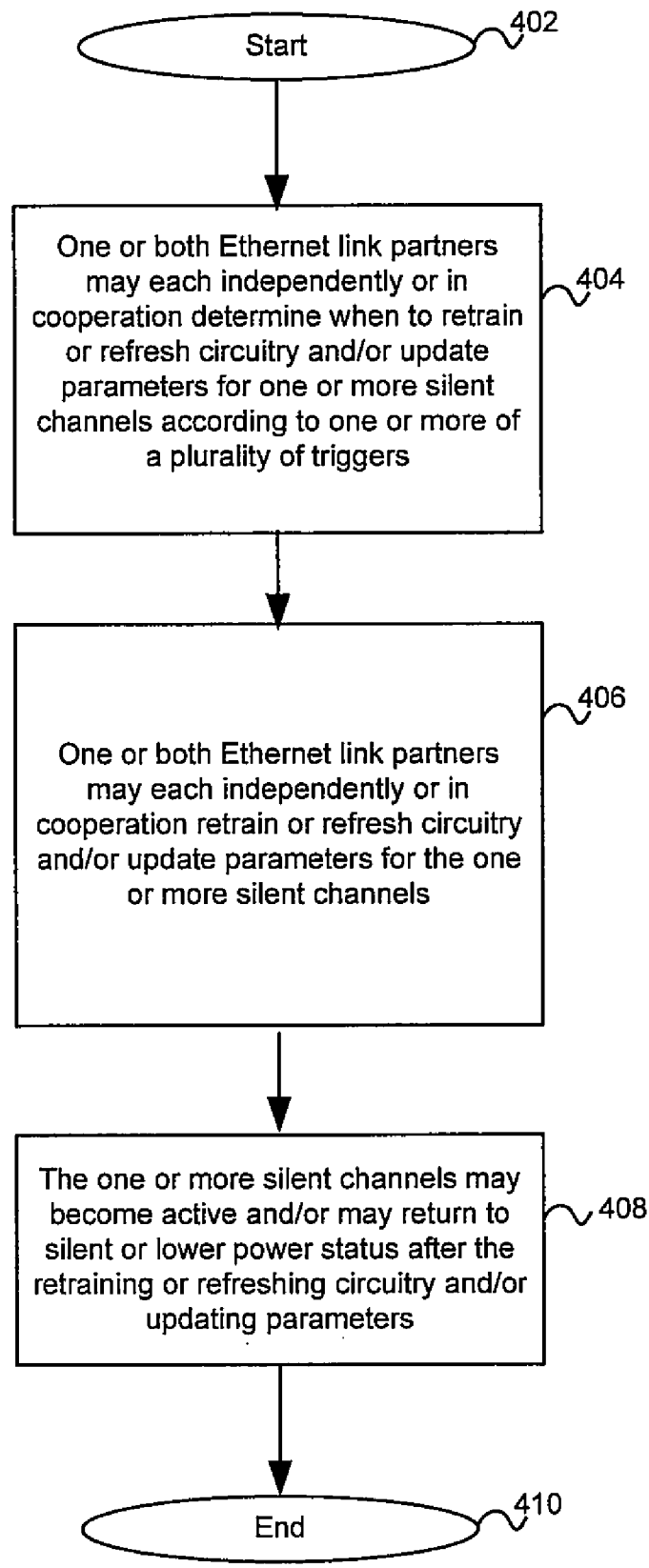

METHOD AND SYSTEM FOR TRIGGERING TRAINING FOR ETHERNET CHANNELS TO SUPPORT ENERGY EFFICIENT ETHERNET NETWORKS

CROSS-REFERENCE TO RELATED APPLICATIONS/INCORPORATION BY REFERENCE

The present application is a continuation-in-part of application Ser. No. 11/859,429, filed on Sep. 21, 2007, now U.S. Pat. No. 8,218,567, which claims priority to provisional application No. 60/894,240, filed on Mar. 12, 2007 and provisional application 60/917,870, filed on May 14, 2007.

This application also makes reference to:
U.S. patent application Ser. No. 11/859,429 which was filed on Sep. 21, 2007;
U.S. patent application Ser. No. 12/042,139 which was filed on Mar. 4, 2008;
U.S. patent application Ser. No. 12/049,000 which was filed on Mar. 14, 2008;
U.S. patent application Ser. No. 12/195,199 which was filed on Aug. 20, 2008,
U.S. patent application Ser. No. 12/107,434 which was filed on Apr. 22, 2008;
U.S. patent application Ser. No. 12/049,015 which was filed on Mar. 14, 2008; and
U.S. patent application Ser. No. 12/235,410 which was filed on Sep. 22, 2008.

Each of the above stated applications is hereby incorporated herein by reference in its entirety.

FIELD OF THE INVENTION

Certain embodiments of the invention relate to networking. More specifically, certain embodiments of the invention relate to a method and system for triggering training for Ethernet channels to support energy efficient Ethernet networks.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often result in significant increases in power consumption.

New transmission technologies enable higher transmission rates over copper cabling infrastructures. Various efforts exist in this regard, including technologies that enable transmission rates that may even reach 100 Gigabit-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. Non-standard transmission rates comprise 2.5 Gbps as well as 5 Gbps.

The specification for 10 Gigabit-per-second (Gbps) Ethernet transmissions over twisted-pair cabling (10GBASE-T) is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. New IEEE cabling specifications are being considered for 40 Gbps and 100 Gbps rates.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for triggering training for Ethernet channels to support energy efficient Ethernet networks, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4 is a flow chart illustrating exemplary steps for retraining or refreshing link partners and/or updating parameters for silent Ethernet channels, in accordance with an embodiment of the invention.

DETAILED DESCRIPTION OF THE INVENTION

Certain embodiments of the invention may be found in a method and system for triggering training for Ethernet channels to support energy efficient Ethernet networks. In some embodiments of the invention, an Ethernet link may comprise one or more link partners that may be communicatively coupled via a plurality of channels wherein one or more channels may be active and/or one or more channels may be silent or set to a lower power. For example, silent channels may have a rate of zero. The Ethernet link partners may perform training and/or updating of one or more parameters for one or more of the plurality of channels. In this regard, the link partners may be trained and/or one or more parameters for the link partners may be updated to account for variable operating conditions such as type of cabling and/or length of cabling or for environmental conditions. For example, environmental conditions may comprise temperature changes and/or electromagnetic coupling such as noise received from far-end and/or near-end neighboring cabling known as alien FEXT and alien NEXT respectively. The training and/or updating may be unmanaged, for example, it may occur routinely, according to schedule and/or automatically. The training and/or updating may be initiated based on a variety of triggers. For example, triggering the training of link partners and/or updating of the one or more of parameters and/or circuits for the silent channels may be based upon one or more fixed times, various time and/or periodic time intervals, a pseudorandom timer and a random timer. Training of link partners and/or updating of parameters may occur for an echo canceller, a far-end crosstalk canceller and a near-end crosstalk canceller for any of the silent channels. Subsequent to the training and/or updating, the one or more silent channels may be activated and/or may remain silent.

Figure 1:
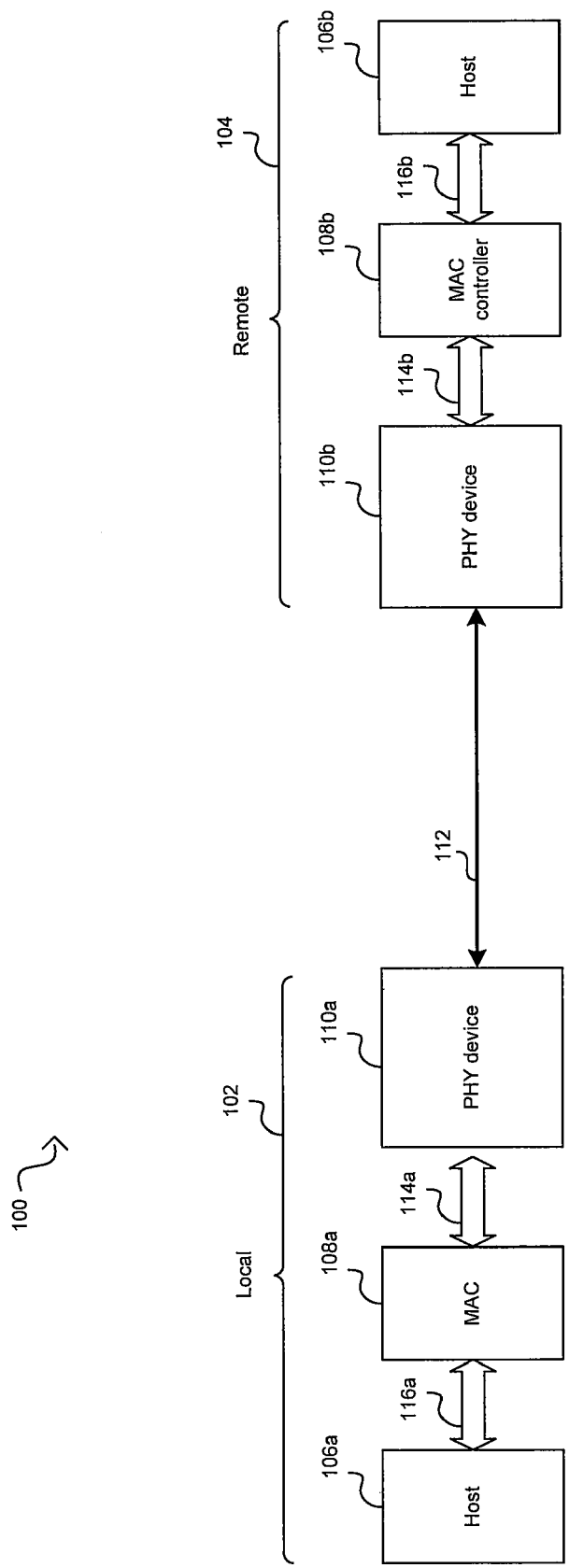
FIG. 1 is a block diagram illustrating an Ethernet connection between a local link partner and a remote link partner, in accordance with an embodiment of the invention.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 may communicate via a cable 112. In an exemplary embodiment of the invention, the cable 112 may comprise up to four or more channels, each of which may, for example, comprise an unshielded twisted pair (UTP). The local link partner 102 and the remote link partner 104 may communicate via two or more channels comprising the cable 112. For example, Ethernet over twisted pair standards 10Base-T and 100Base-TX may utilize two pairs of UTP while Ethernet over twisted pair standards 1000Base-T and 10GBase-T may utilize four pairs of UTP.

In an exemplary embodiment of the invention, the link partners 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the link partners 102 and/or 104 may comprise a backplane PHY capable of operating at one or more standard rates such as 10 Gbps (10GBASE-KX4 and/or 10GBASE-KR); potentially standardized rates such as 40 Gbps and 100 Gbps and/or non-standard rates such as 2.5 Gbps and 5 Gbps.

In an exemplary embodiment of the invention, the link partners 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the link partners 102 and 104 may be enabled to utilize Audio/Video Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet operations. The PHY device s 110a and 110b may enable communications, such as 10 Mbps, 100 Mbps, 1000 Mbps (or 1 Gbps), 2.5 Gbps, 4 Gbps, 5 Gbps, 10 Gbps or 40 Gbps or 100 Gbps for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high(er) data rate in one direction and transmission and/or reception at a low(er) data rate in the other direction. For example, the local link partner 102 may comprise a multimedia server and the remote link partner 104 may comprise a multimedia client. In this regard, the local link partner 102 may transmit multimedia data, for example, to the remote partner 104 at high(er) data rates while the remote link partner 104 may transmit control or auxiliary data associated with the multimedia content at low(er) data rates. In addition, a change in rate such as stepping up in rate or stepping down in rate may occur asymmetrically among the PHY devices 110a and/or 110b which may support energy efficient Ethernet. For example, the PHY 110a may change rate based on a change of rate in 110b however, PHY 110a may change to a different rate than PHY 110b. Moreover, the PHY devices 110a and 110b may change rates independent of each other, for example, one PHY may change rate while the other does not change rate. In some embodiments of the invention, one or more of the PHY devices may step down to a rate of zero The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE symbols that may be communicated between frames of data, during inter frame gap (IFG)).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of channels which may result in network links being underutilized for significant portions of time. When the link partners 102 and 104 first establish a connection, they may exchange some preliminary information and/or training signals. In this regard, the link partners 102 and 104 may negotiate a data rate (e.g., 10 Gbps) and duplex mode (e.g., full-duplex) for communicating with each other. Additionally, in order to establish reliable communications, each of the link partners 102 and 104 may need to adjust various parameters and/or circuitry to account for variables such as the type of cabling over which data is being communicated and environmental conditions (e.g. temperature) surrounding the cabling. Accordingly, training of link partners and/or updating parameters for an Ethernet channel may adapt an Ethernet channel to current conditions such that functions such as echo cancellation, far-end crosstalk cancellation, and near-end crosstalk cancellation may be performed.

Link partners may train circuits and/or update parameters periodically. For example, channels which have been inactive for a period of time may need to be "retrained" such that corresponding circuitry and/or parameters, which may become outdated over time, are refreshed in order to provide reliable data communications over the channel(s). Full training steps for a channel that has been silent or inactive may take up to the order of 100 ms or up to the order of seconds. In accordance with various embodiments of the invention, this time may be reduced significantly since the silent or inactive channels may not need to go through a full training cycle.

Figure 2:
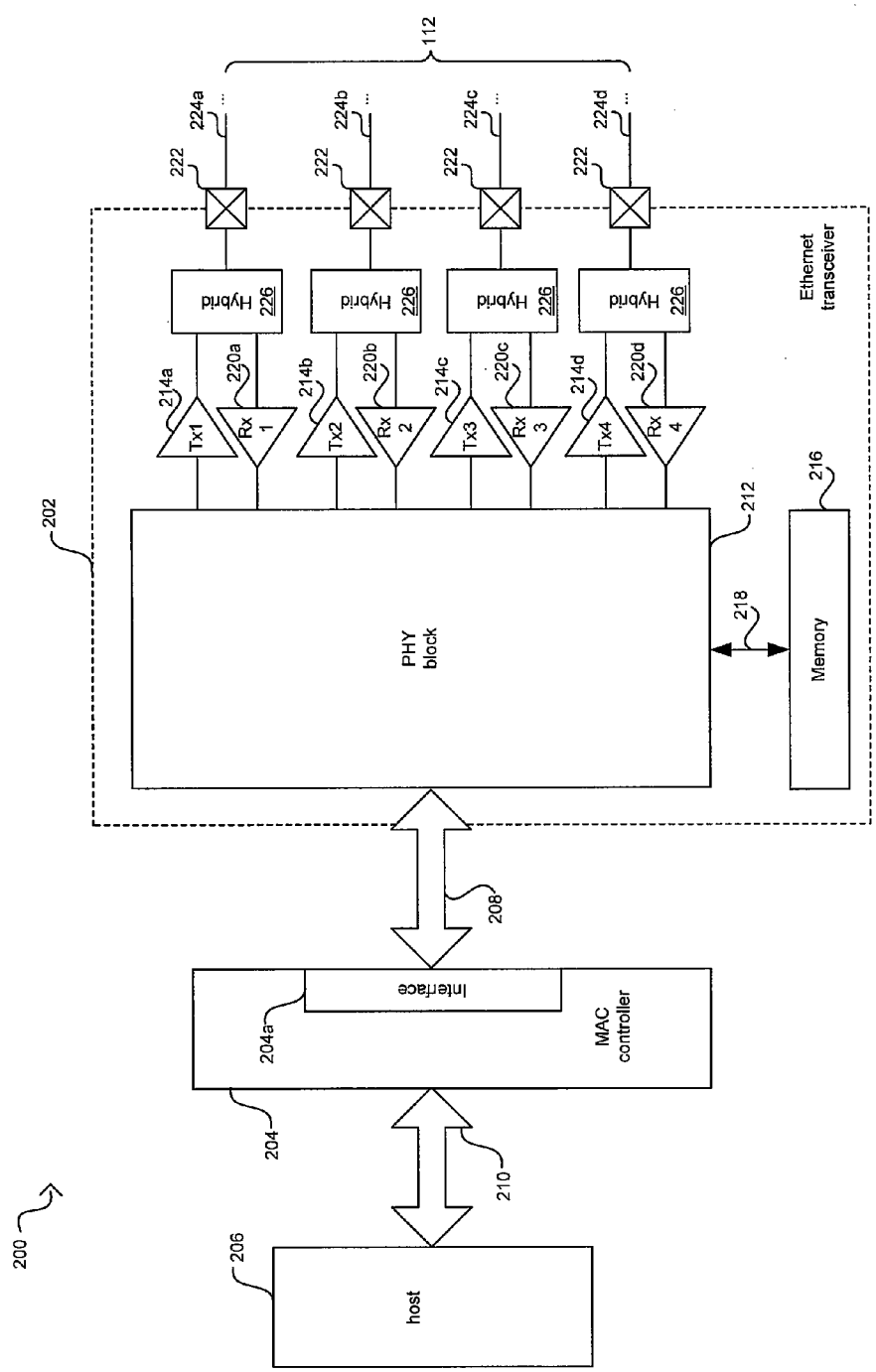
FIG. 2 is a block diagram illustrating an exemplary Ethernet over twisted pair PHY device architecture comprising a physical block, in accordance with an embodiment of the invention.

FIG. 2 is a block diagram illustrating an exemplary Ethernet over twisted pair PHY device architecture, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a physical layer block 212, one or more transmitters 214, one or more receivers 220, a memory 216, a memory interface 218, one or more input/output interfaces 222 and channels 224.

The PHY device 202 may be an integrated device that may comprise a physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise an interface 204a that may comprise suitable logic, circuitry, and/or code to enable communication with the PHY device 202 via the interface 208.

The physical layer block 212 in the PHY device 202 may comprise suitable logic, circuitry, and/or code that may enable operability and/or functionality of physical layer requirements. In this regard, the physical layer block 212 may enable generating the appropriate link discovery signaling utilized for establishing communication with a remote PHY device in a remote link partner. The physical layer block 212 may communicate with the MAC controller 204 via the interface 208. In one aspect of the invention, the interface 208 may be a media independent interface (MII) and may be configured to utilize a plurality of serial data lanes for receiving data from the physical layer block 212 and/or for transmitting data to the physical layer block 212. The physical layer block 212 may be configured to operate in one or more of a plurality of communication modes, where each communication mode may implement a different communication protocol. These communication modes may include, but are not limited to, Ethernet over twisted pair standards 10Base-T, 100Base-TX, 1000Base-T, 10GBase-T, and other similar protocols. The physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information.

The physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the physical layer block 212. The parameters may comprise configuration data and the code may comprise operational code such as software and/or firmware, but the information need not be limited in this regard. Moreover, the parameters may include adaptive filter and/or block coefficients for use by the physical layer block 212, for example.

Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a channel that may comprise the cable 112. In this manner, a transmitter/receiver pair may interface with each of the channels 224a, 224b, 224c, 224d.

The input/output interfaces 222 may comprise suitable logic circuitry, and/or code that may enable the PHY device 202 to impress signal information onto a physical medium comprising a channel, for example a twisted pair channel comprising the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium comprising the channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the link partner 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the local link partner 300 may be communicatively coupled to an input/output interface 222.

Due to the complex nature of the signal processing involved with, for example, duplex and/or asymmetric communication that may comprise high data rates, various components of the link partner 200 may be "trained" in order to provide reliable communications with a remote link partner. For example, the echo cancellers, FEXT cancellers, and/or NEXT cancellers may comprise one or more configuration parameters which may be determined based exemplary factors comprising environmental conditions, distance to the remote link partner, and data rate. Accordingly, these configuration parameters may need to be configured upon establishing a connection to a remote link partner. Moreover, these parameters may need to be periodically refreshed due to, for example, environmental changes. For example, environmental conditions may comprise temperature changes and/or electromagnetic coupling such as noise received from far-end and/or near-end neighboring cabling known as alien FEXT and alien NEXT respectively. In the event that one or more links 224 may be inactive for some amount of time, environmental conditions may change and training coefficients and/or parameters may need to be updated prior to activating data traffic on the link. Proper training of link partners and/or appropriate updating of parameters may improve a plurality of problems, for example, bit error rate, packet drops, time to activate a link from a silent state, buffer overflows and/or link drop.

Figure 3:
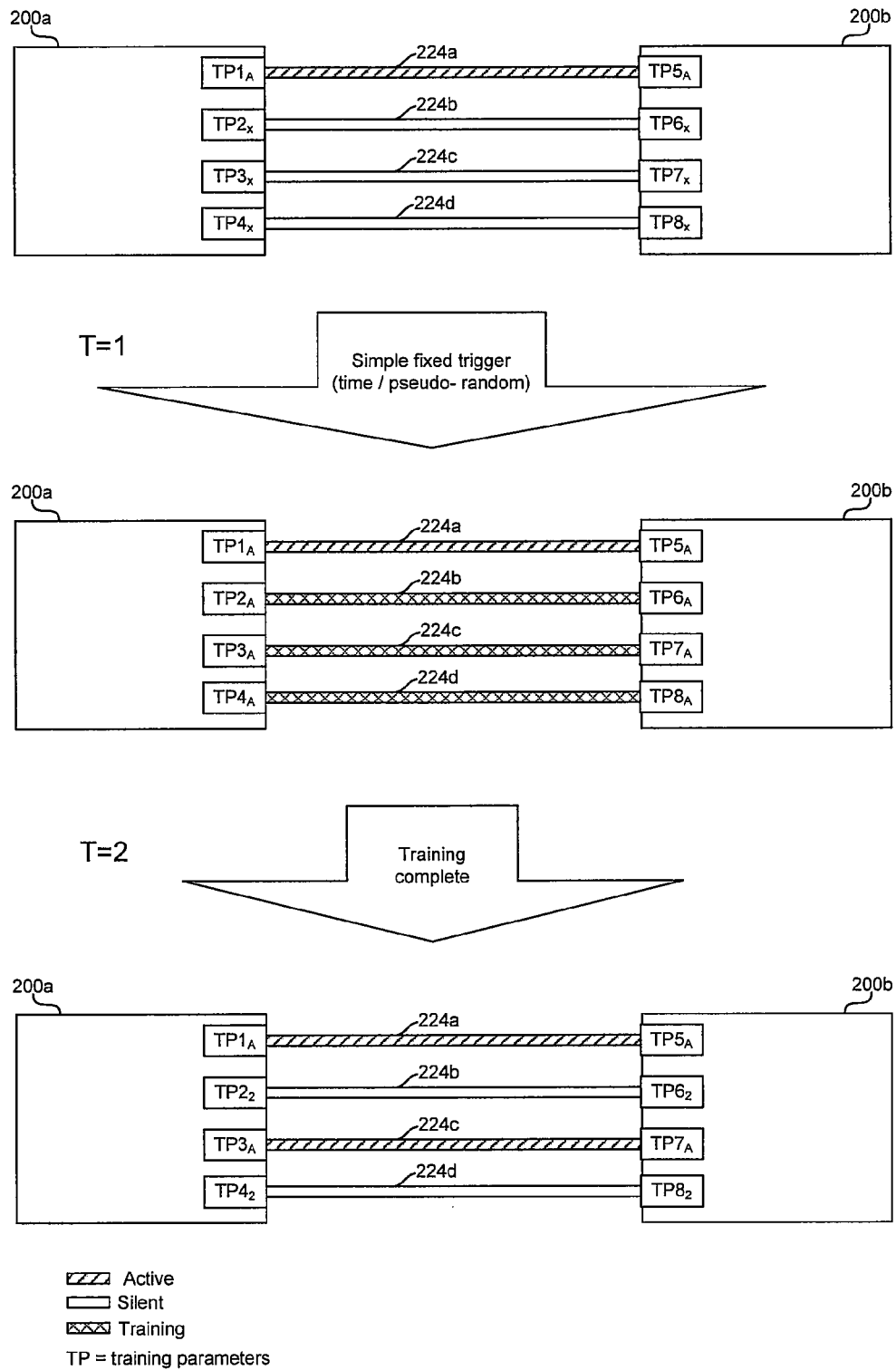
FIG. 3 is a diagram illustrating retraining or refreshing of link partners and/or updating parameters for silent Ethernet channels, in accordance with an embodiment of the invention.

FIG. 3 is a diagram illustrating retraining or refreshing of link partners and/or updating parameters for silent Ethernet channels, in accordance with an embodiment of the invention. Referring to FIG. 3 there is shown the link partners 200a and 200b which may communicate via one or more of the channels 224a, 224b, 224c, and 224d Referring to FIG. 3, prior to time instant T=1, the channel 224a may be actively carrying traffic and training parameters TP1 and/or TP5 may be persistently updated or refreshed during active periods of time. In some embodiments of the invention, a portion of the components dedicated to an active channel may be interrupted and may be need to be refreshed. Channels 224b, 224c, and 224d may be silent or in a lower power state. Accordingly, there may be no traffic communicated over channels 224b, 224c, and 224d to trigger training activity for parameters TP2, TP3, TP4, TP6, TP7 and TP8. In accordance with various embodiments of the invention, the link partners 200a and/or 200b may each automatically initiate retraining or refreshing of various circuits and/or may each update parameters for one or more of the silent channels 224b, 224c, and 224d according to their respective operating conditions. Training of link partners for a silent channel may comprise for example, transmission of a pulse or a depleted low density parity check code (LDPC) frame via the silent channel. When to retrain or refresh circuitry and/or update parameters for link partner 200a for parameters TP2, TP3 and/or TP4 and/or on link partner 200b for parameters TP6, TP7 and/or TP8 may be based on one or more of a plurality of triggers. For example, the one or more of a plurality of triggers may comprise fixed times, periodic or aperiodic time intervals, timers such as random timers and/or pseudorandom timers, system events and sensed physical conditions such as noise, temperature level, cable type and/or cable length. Moreover, in some embodiments of the invention, programming from, for example, a layer above the physical layer, may generate the trigger. In addition, one or both of the link partners 200a and 200b may exchange information regarding when and/or how to retrain or refresh circuitry and/or update parameters. In this regard, retraining or refreshing circuitry and/or updating parameters by link partner 200a for parameters TP2, TP3 and/or TP4 and/or by link partner 200b for parameters TP6, TP7 and/or TP8 for channels 224b, 224c and/or 224d may be executed during the interval from time instant T=1 until time instant T=2. Training activity executed during the interval from time instant T=1 until time instant T=2 may comprise a refresh of parameters which may have been configured based on a full training cycle performed for an initial start up of the link partners 200a and/or 200b. In an exemplary embodiment of the invention, upon completion of training, the channel 224c may become active and carry traffic. The channels 224b and 224d may return to a silent or low(er) power state, but with their respective training parameters, TP2, TP4, TP6 and TP8, updated as of time instant T=2.

In some embodiments of the invention, one or both of the link partners 200a and 200b may be enabled to determine a maximum time between training and/or refreshing for a channel. Accordingly, the link partners 200a and 200b may be enabled to trigger training for one or more of the channels 224a, 224b, 224c, and 224d at time intervals less than or equal to the determined maximum. In various embodiments of the invention, training may be performed at fixed times and/or determined, periodic, random, or pseudo-random time intervals for example. After training a link partner for a channel, the channel may become active and carry traffic or may return to a silent or low(er) power state.

FIG. 4 is a flow chart illustrating exemplary steps for retraining or refreshing link partners and/or updating parameters for silent Ethernet channels, in accordance with an embodiment of the invention. Referring to FIG. 4, after start step 402, in step 404, one or both Ethernet link partners 200a and 200b may determine when to perform retraining or refreshing of circuitry and/or updating of parameters for one or more silent channels such as 224b, 224c and/or 224d according to fixed times, periodic or aperiodic time intervals, a random and a pseudorandom timer, one or more physical conditions within said Ethernet link environment such as noise, temperature level, cable type and/or cable length for example, communication from a corresponding link partner and/or based on programming from, for example, a layer above the physical layer, for example. In this regard, the link partners 200a and 200b may determine when to initiate their respective retraining and refreshing independently or in cooperation with each other. In step 406, one or both Ethernet link partners 200a and 200b may execute the retraining or refreshing of circuitry and/or may update parameters for one or more of the silent channels 224b, 224c and/or 224d according to fixed times, time intervals, random or pseudorandom timers and/or triggering events, for example. In step 408, the one or more silent channels 224b, 224c and/or 224d may become active and/or may return to silent or lower power status after training activity and/or parameter updates. Step 410 may be an end of exemplary steps.

In an embodiment of the invention an Ethernet link 112 may comprise one or more link partners such as 200a and/or 200b that may be communicatively coupled via one or more silent channels such as 224c and/or 224d. The link partners 200a and/or 200b may perform retraining or refreshing circuits and/or updating of one or more of parameters for the one or more silent channels such as 224c and/or 224d. Triggering of the retraining or refreshing and/or said updating may be based upon the occurrence of an event, for example, triggering may be based on link statistics. In addition, the triggering may be based upon one or more of fixed times, periodic or aperiodic time intervals, a random and a pseudorandom timer, one or more physical conditions within said Ethernet link environment such as noise, temperature level, cable type and/or cable length for example, communication from a corresponding link partner and/or based on programming from, for example, a layer above the physical layer. For the silent channels 224c and/or 224d, the parameters may be updated and/or the link partner circuits may be retrained or refreshed for one or more of an echo canceller, a far-end crosstalk canceller and/or a near-end crosstalk canceller corresponding to the one or more silent channels 224c and/or 224d. Subsequent to the retraining or refreshing and/or updating, the one or more silent channels 224c and/or 224d may be activated for handling traffic and/or may remain silent. Moreover, the retraining or refreshing activity and/or updating of parameters may be for one or more of an echo canceller, a far-end crosstalk canceller, and a near-end crosstalk canceller corresponding to said one or more silent channels. Subsequent to the training activity and/or updating of parameters, one or more of the silent channels may be activated.

Another embodiment of the invention may provide a machine-readable storage, having stored thereon, a computer program having at least one code section executable by a machine, thereby causing the machine to perform the steps as described herein for triggering training for Ethernet channels to support energy efficient Ethernet networks.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking to provide reliable data communications over one or more channels, the method comprising:

in an Ethernet link comprising one or more link partners communicatively coupled via one or more active channels and one or more silent channels;

receiving one or more distinct physical patterns of IDLE symbols from a link partner via said one or more silent channels for adjusting a plurality of parameters according to link statistics, wherein said one or more distinct patterns of IDLE symbols comprise a modification in one or more of signal constellation, pulse amplitude modulation levels, and a length of time between frames;

adjusting said plurality of parameters according to said modification, wherein said adjusting occurs after one or both of initialization of said circuitry and initial configuration of said plurality of parameters.

2. The method according to claim 1, comprising triggering said adjusting of said plurality of parameters at fixed times.

3. The method according to claim 1, comprising triggering said adjusting of said plurality of parameters at periodic or aperiodic time intervals.

4. The method according to claim 1, comprising triggering said adjusting of said plurality of parameters based on a random timer or a pseudorandom timer.

5. The method according to claim 1, comprising triggering said adjusting of said plurality of parameters based on one or more physical conditions within said Ethernet link environment.

6. The method according to claim 1, comprising triggering said adjusting of said plurality of parameters based on programming.

7. The method according to claim 1, comprising executing said adjusting of said plurality of parameters for one or more of an echo canceller, a far-end crosstalk canceller, and a near-end crosstalk canceller corresponding to said one or more silent channels.

8. The method according to claim 1, comprising activating one or more of said silent channels subsequent to said adjusting of said plurality of parameters.

9. A system for networking to provide reliable data communications over one or more channels, the system comprising:
   one or more circuits in a link partner coupled to an Ethernet link comprising one or more active channels and one or more silent channels, said one or more circuits configured to perform:
   receiving one or more distinct physical patterns of IDLE symbols from a link partner via said one or more silent channels for adjusting a plurality of parameters according to link statistics, wherein said one or more distinct patterns of IDLE symbols comprise a modification in one or more of signal constellation, pulse amplitude modulation levels, and a length of time between frames;
   adjusting said plurality of parameters according to said modification, wherein said adjusting occurs after one or both of initialization of said circuitry and initial configuration of said plurality of parameters.

10. The system according to claim 9, wherein said one or more circuits are configured to trigger said adjusting of said plurality of parameters at fixed times.

11. The system according to claim 9, wherein said one or more circuits are configured to trigger said adjusting of said plurality of parameters at periodic or aperiodic time intervals.

12. The system according to claim 9, wherein said one or more circuits are configured to trigger said adjusting of said plurality of parameters based on a random timer or a pseudorandom timer.

13. The system according to claim 9, wherein said one or more circuits are configured to trigger said adjusting of said plurality of parameters based on one or more physical conditions within said Ethernet link environment.

14. The system according to claim 9, wherein said one or more circuits are configured to trigger said adjusting of said plurality of parameters based on programming.

15. The system according to claim 9, wherein said one or more circuits are configured to trigger said adjusting of said plurality of parameters for one or more of an echo canceller, a far-end crosstalk canceller, and a near-end crosstalk canceller corresponding to said one or more silent channels.

16. The system according to claim 9, wherein said one or more circuits are configured to activate one or more of said silent channels subsequent to said adjusting of said plurality of parameters.

17. A non-transitory machine-readable storage having stored thereon, a computer program having at least one code section for networking to provide reliable data communications over one or more channels, the at least one code section being executable by a machine for causing the machine to perform steps comprising:
   in an Ethernet link comprising one or more link partners communicatively coupled via one or more active channels and one or more silent channels:
   receiving one or more distinct physical patterns of IDLE symbols from a link partner via said one or more silent channels for adjusting a plurality of parameters according to link statistics, wherein said one or more distinct patterns of IDLE symbols comprise a modification in one or more of signal constellation, pulse amplitude modulation levels, and a length of time between frames;
   adjusting said plurality of parameters according to said modification, wherein said adjusting occurs after one or both of initialization of said circuitry and initial configuration of said plurality of parameters.

18. The machine-readable storage according to claim 17, wherein said at least one code section comprises code for triggering said adjusting of said plurality of parameters at fixed times.

19. The machine-readable storage according to claim 17, wherein said at least one code section comprises code for triggering said adjusting of said plurality of parameters at periodic or aperiodic time intervals.

20. The machine-readable storage according to claim 17, wherein said at least one code section comprises code for triggering said adjusting of said plurality of parameters based on a random timer or a pseudorandom timer.

21. The machine-readable storage according to claim 17, wherein said at least one code section comprises code for triggering said adjusting of said plurality of parameters based on one or more physical conditions within said Ethernet link environment.

22. The machine-readable storage according to claim 17, wherein said at least one code section comprises code for triggering said adjusting of said plurality of parameters based on programming.

23. The machine-readable storage according to claim 17, wherein said at least one code section comprises code for executing said adjusting of said plurality of parameters for one or more of an echo canceller, a far-end crosstalk canceller, and a near-end crosstalk canceller corresponding to said one or more silent channels.

24. The machine-readable storage according to claim 17, wherein said at least one code section comprises code for activating one or more of said silent channels subsequent to said adjusting of said plurality of parameters.

* * * * *